US010044099B2

(12) United States Patent
Leung et al.

(10) Patent No.: US 10,044,099 B2
(45) Date of Patent: Aug. 7, 2018

(54) COMPACT SHIELDED AUTOMOTIVE RADAR MODULE AND METHOD

(71) Applicant: Veoneer US, Inc., Southfield, MI (US)

(72) Inventors: Richard Leung, Westford, MA (US); Bernard DeMersseman, Andover, MA (US)

(73) Assignee: Veoneer US, Inc., Southfield, MI (US)

( * ) Notice: Subject to any disclaimer, the term of this patent is extended or adjusted under 35 U.S.C. 154(b) by 18 days.

(21) Appl. No.: 15/026,405

(22) PCT Filed: Oct. 1, 2014

(86) PCT No.: PCT/US2014/058632
§ 371 (c)(1),
(2) Date: Mar. 31, 2016

(87) PCT Pub. No.: WO2015/050994
PCT Pub. Date: Apr. 9, 2015

(65) Prior Publication Data
US 2016/0218420 A1 Jul. 28, 2016

Related U.S. Application Data

(60) Provisional application No. 61/885,364, filed on Oct. 1, 2013.

(51) Int. Cl.
*G01S 13/93* (2006.01)
*H01Q 1/32* (2006.01)
(Continued)

(52) U.S. Cl.
CPC .......... *H01Q 1/3233* (2013.01); *G01S 7/032* (2013.01); *G01S 13/931* (2013.01); *H01Q 1/42* (2013.01);
(Continued)

(58) Field of Classification Search
CPC .............................. G01S 7/032; H01Q 1/3233
(Continued)

(56) References Cited

U.S. PATENT DOCUMENTS 5,525,988 A * 6/1996 Perkins ................ H01Q 17/001
342/4
5,962,148 A * 10/1999 Nishimura ............... C09D 4/06
156/230

(Continued)

FOREIGN PATENT DOCUMENTS

DE 10252446 5/2004
DE 102011052363 2/2013
(Continued)

OTHER PUBLICATIONS

Search Report and Written Opinion dated Jan. 30, 2015 in corresponding international application PCT/US2014/058632, filed Oct. 1, 2014.

*Primary Examiner* — Marcus E Windrich
(74) *Attorney, Agent, or Firm* — Burns & Levinson, LLP; Steven M. Mills

(57) ABSTRACT

An automobile radar module and method include a PCB having a first side on which RF electronic components are mounted and a second side on which digital electronic components are mounted. An EMI shield is mounted over the first side of the PCB, and a radome is mounted over the EMI shield. The EMI shield comprises an aperture exposing RF components on the first side of the PCB. The radome comprises a protrusion which protrudes into the aperture in the EMI shield. The protrusion and sidewalls of the aperture define a shielded region above the RF components on the first side of the PCB. The sidewalls extend at an acute angle with respect to a plane of the primary surface of the EMI shield, the acute angle being selected based on operational (Continued)

parameters of the radar module such that a predetermined shielding performance is realized.

20 Claims, 10 Drawing Sheets

(51) Int. Cl.
    *H01Q 1/42*      (2006.01)
    *H01Q 1/52*      (2006.01)
    *H01Q 21/00*     (2006.01)
    *H01Q 21/06*     (2006.01)
    *G01S 7/03*      (2006.01)
    *G01S 7/02*      (2006.01)
(52) U.S. Cl.
    CPC ......... *H01Q 1/526* (2013.01); *H01Q 21/0075* (2013.01); *H01Q 21/065* (2013.01); *G01S 2007/027* (2013.01); *G01S 2007/028* (2013.01)
(58) Field of Classification Search
    USPC ...................................... 342/70–72
    See application file for complete search history.

(56)          References Cited

U.S. PATENT DOCUMENTS 6,153,070  A  *  11/2000  Maurer ............... G01N 27/414
                                                          204/416
    6,937,184  B2    8/2005  Fujieda et al.
    8,013,775  B2    9/2011  Woods
    9,110,162  B2 *  8/2015  Matsuzawa .......... H01Q 1/3233
    9,157,986  B2   10/2015  Waldschmidt et al.
    2001/0040524 A1 11/2001  Suzuki et al.
    2003/0098786 A1  5/2003  Bishop
    2004/0036645 A1 *  2/2004  Fujieda ................. G01S 7/03
                                                          342/70
    2004/0227663 A1 * 11/2004  Suzuki .................. G01S 7/03
                                                          342/70
    2006/0098786 A1  5/2006  Eck
    2006/0152406 A1 *  7/2006  Leblanc ................ G01S 7/032
                                                          342/175
    2007/0103375 A1 *  5/2007  Laubner .............. H01Q 1/3275
                                                          343/713
    2007/0216587 A1  9/2007  Schmidt et al.
    2009/0122138 A1  5/2009  Bischoff et al.
    2009/0250794 A1 * 10/2009  St. Germain ..... H01L 23/49562
                                                          257/676
    2014/0368375 A1 12/2014  Baftiu et al.

FOREIGN PATENT DOCUMENTS

DE      102011114850      4/2013
    DE      112012001758      2/2014
    DE      102012017669      3/2014
    EP           642190       3/1995
    EP          1398647       3/2004
    EP          1462817       9/2004
    EP          1471598      10/2004
    EP          1762860       3/2007
    EP          1898231       3/2008
    WO       2015050994       4/2015
    WO       2015094538       6/2015

* cited by examiner

COMPACT SHIELDED AUTOMOTIVE RADAR MODULE AND METHOD

RELATED APPLICATION

This application claims the benefit of U.S. Provisional Patent Application No. 61/885,364, filed on Oct. 1, 2013, the entire contents of which are incorporated herein by reference.

BACKGROUND

1. Technical Field

This disclosure is related to automotive radar devices and methods, and, more particularly, to automotive radar devices and methods having improved EMI shielding.

2. Discussion of Related Art

Existing radar sensor modules generally include two separate printed circuit boards (PCBs). One of the PCBs typically includes components dedicated to handling radio frequency (RF) radar signals, and the other PCB typically includes components dedicated to handling digital signal processing (DSP) tasks. A sensor module using the two-PCB design typically requires connectors and cabling to connect the two PCBs, such that shielding to protect against electromagnetic interference (EMI) is difficult to provide. It is also difficult to maintain sufficient RF isolation between active components in such devices. In some conventional configurations, conductive gaskets, RF absorbers and metal covers are required to meet RF functional and EMI shielding requirements. Such devices can be cumbersome, and can be expensive to manufacture.

SUMMARY

According to one aspect, an automobile radar module is provided. The module includes a housing and a printed circuit board (PCB) mounted in the housing, the PCB having a first side on which radio frequency (RF) electronic components are mounted and a second side on which digital electronic components are mounted. An electromagnetic interference (EMI) shield is mounted over the first side of the PCB, and a radome is mounted over the EMI shield. The EMI shield comprises at least one aperture through a primary surface of the EMI shield, the at least one aperture exposing at least a portion of the RF components on the side of the PCB. The radome comprises at least one protrusion which protrudes into the at least one aperture in the EMI shield. The at least one protrusion on the radome and sidewalls of the at least one aperture on the EMI shield define a shielded region above the portion of the RF components on the first side of the PCB. The sidewalls of the at least one aperture extend at an acute angle with respect to a plane of the primary surface of the EMI shield, the acute angle being selected based on operational parameters of the radar module such that a desired shielding performance is realized.

In some exemplary embodiments, the PCB and the EMI shield are mounted in the housing on a plurality of heat-stake posts formed in the housing.

In some exemplary embodiments, the housing is made of plastic, which, in some embodiments, is electrically conductive. In some exemplary embodiments, an electrically conductive plating and/or paint is applied to the housing.

In some exemplary embodiments, the EMI shield is made of plastic, which, in some embodiments, is electrically conductive. In some exemplary embodiments, an electrically conductive plating and/or paint is applied to the housing.

According to another aspect, a method of EMI shielding an automobile radar module is provided. According to the method, a printed circuit board (PCB) is mounted in a housing, the PCB having a first side on which radio frequency (RF) electronic components are mounted and a second side on which digital electronic components are mounted. An EMI shield is mounted over the first side of the PCB, and a radome is mounted over the EMI shield. At least one aperture is formed through a primary surface of the EMI shield, the at least one aperture exposing at least a portion of the RF components on the first side of the PCB. At least one protrusion is formed on the radome, the at least one protrusion protruding into the at least one aperture in the EMI shield, such that the at least one protrusion and sidewalls of the at least one aperture on the EMI shield define a shielded region above the portion of the RF components on the first side of the PCB. The sidewalls of the at least one aperture are formed at an acute angle with respect to a plane of the primary surface of the EMI shield, the acute angle being selected based on operational parameters of the radar module such that a desired shielding performance is realized.

In some exemplary embodiments, the PCB and the EMI shield are mounted in the housing on a plurality of heat-stake posts formed in the housing.

In some exemplary embodiments, the housing is made of plastic, which, in some embodiments, is electrically conductive. In some exemplary embodiments, an electrically conductive plating and/or paint is applied to the housing.

In some exemplary embodiments, the EMI shield is made of plastic, which, in some embodiments, is electrically conductive. In some exemplary embodiments, an electrically conductive plating and/or paint is applied to the housing.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
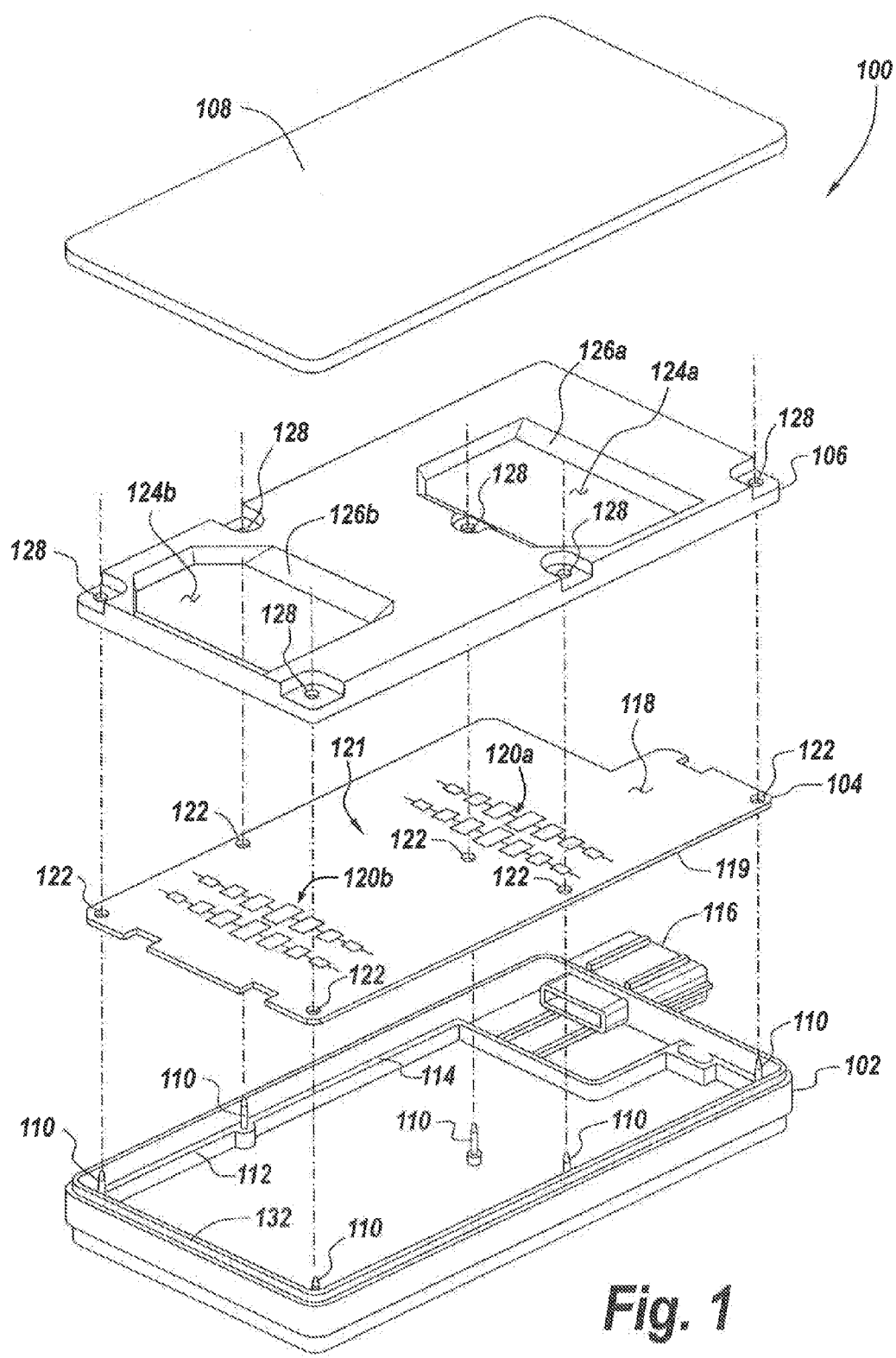
FIG. 1 includes a schematic exploded perspective view of an automobile radar module, taken from above the module, according to some exemplary embodiments.
Figure 2:
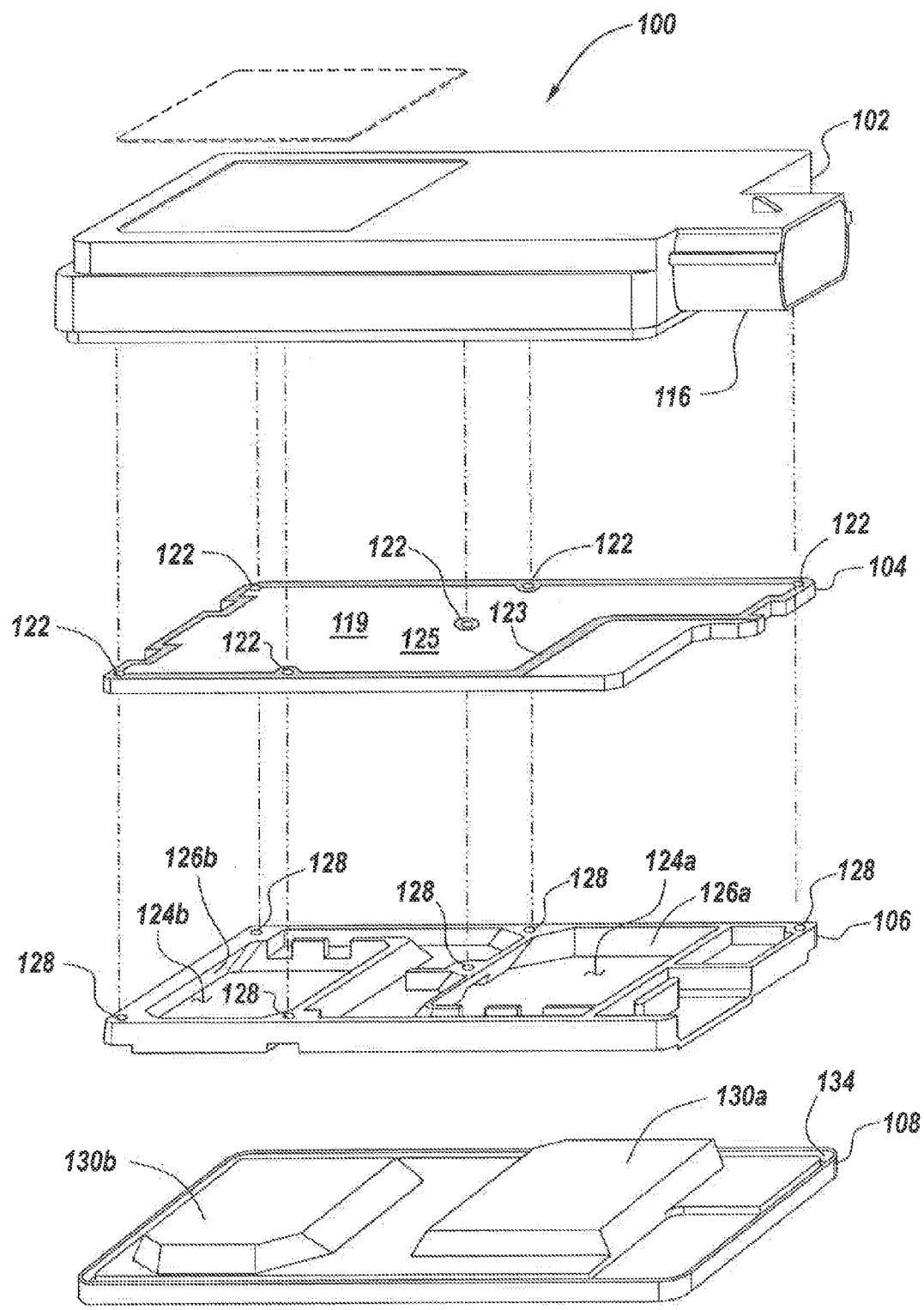
FIG. 2 includes another schematic exploded perspective view of the automobile radar module, taken from below the module, according to some exemplary embodiments.

FIGS. 1 and 2 include schematic exploded perspective views of an automobile radar module taken from different view perspectives. Specifically, FIG. 1 includes a schematic exploded perspective view of an automobile radar module, taken from above the module, according to some exemplary embodiments; and FIG. 2 includes another schematic exploded perspective view of the automobile radar module, taken from below the module, according to some exemplary embodiments.

Figure 3:
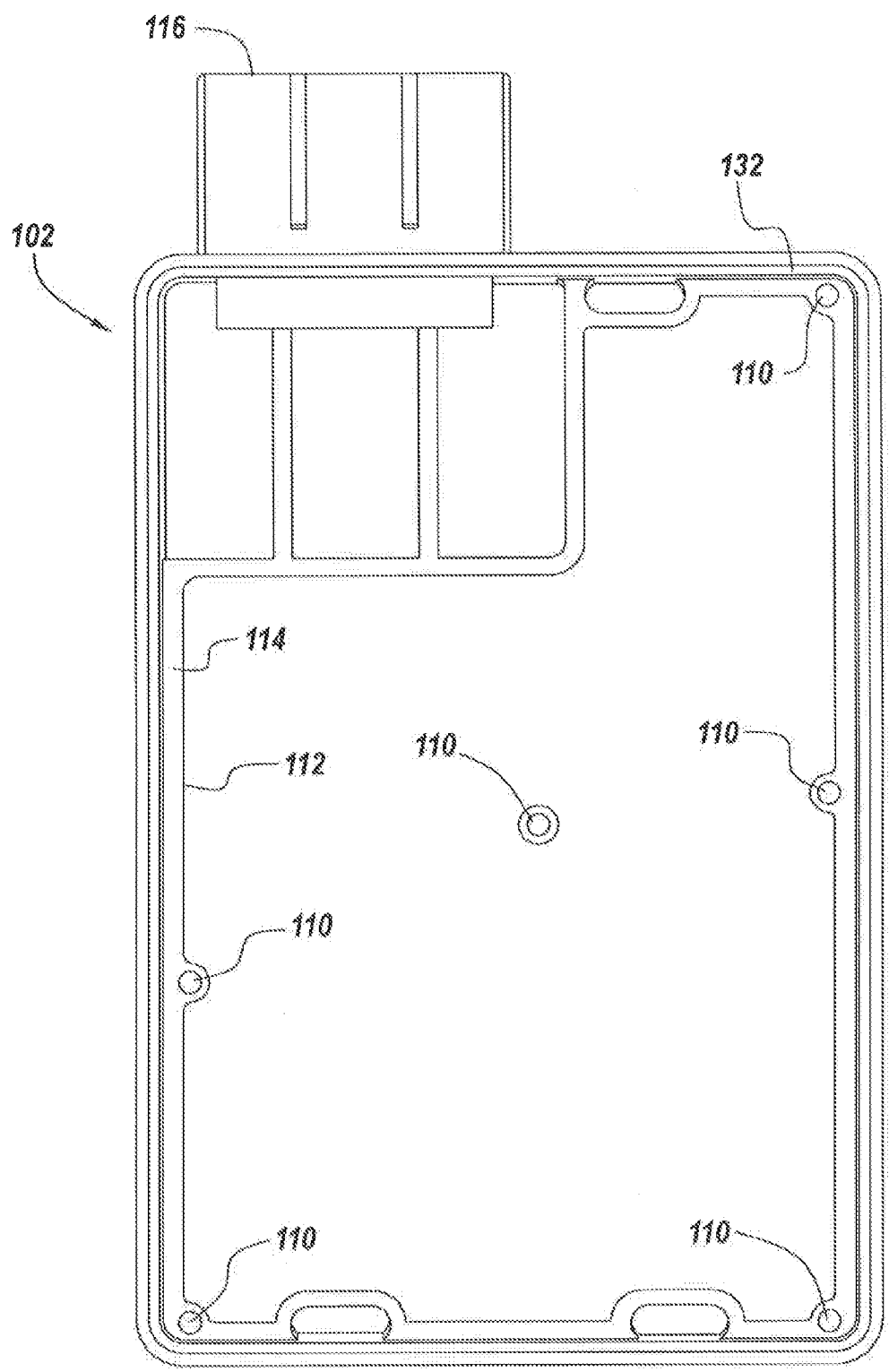
FIG. 3 includes a schematic top view of a housing of the automobile radar module of FIGS. 1 and 2, according to some exemplary embodiments.

Referring to FIGS. 1 and 2, automobile radar module 100 includes a housing or base 102 in which components of module 100 are mounted. Module 100 also includes a PCB 104, an EMI shield 106 and a radome or cover 108 disposed in a stacked configuration and assembled together. FIG. 3 includes a schematic top view of housing 102, according to some exemplary embodiments. Referring to FIGS. 1 through 3, housing 102 can be made of plastic and can be formed by injection molding. Housing 102 can be formed integrally with a shroud 116 for an electrical connector such that shielded electrical connections can be made to module 100. The use of plastic material for housing 102 facilitates laser welding of module radome or cover 108 to housing 102 to ensure a hermetic seal.

For the purpose of EMI shielding module 100, the inner surface of housing 102 is conductive. To that end, the plastic material of housing 102 can be conductive plastic material. Alternatively, or additionally, a conductive plating or paint can be applied to the inside of housing 102. Housing 102 can also include integral heat stake posts 110 used to align PCB 104 via holes 122 and to align EMI shield 106 via holes 128 and to hold housing 102, PCB 104 and EMI shield 106 together. After a heat staking operation is performed on heat stake posts 110, a bottom surface 119 of PCB 104 is held tightly and permanently against conductive top surface 114 of PCB mounting shelf 112 integrally formed in housing 102. Similarly, EMI shield 106 is held tightly and permanently against a top surface 118 of PCB 104.

Figure 4:
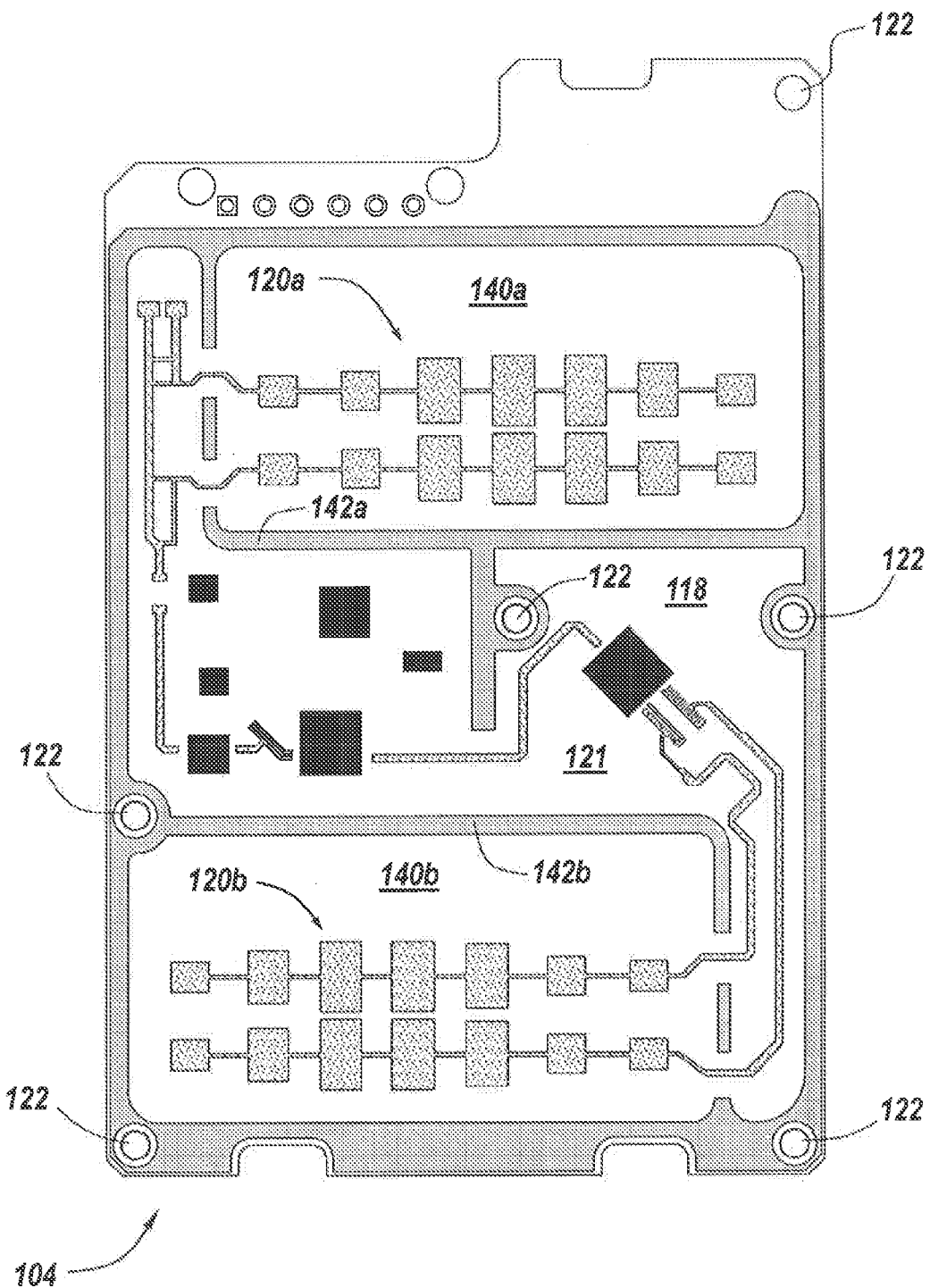
FIG. 4 includes a schematic top view of a printed circuit board (PCB) of the automobile radar module of FIGS. 1 and 2, according to some exemplary embodiments.
Figure 5:
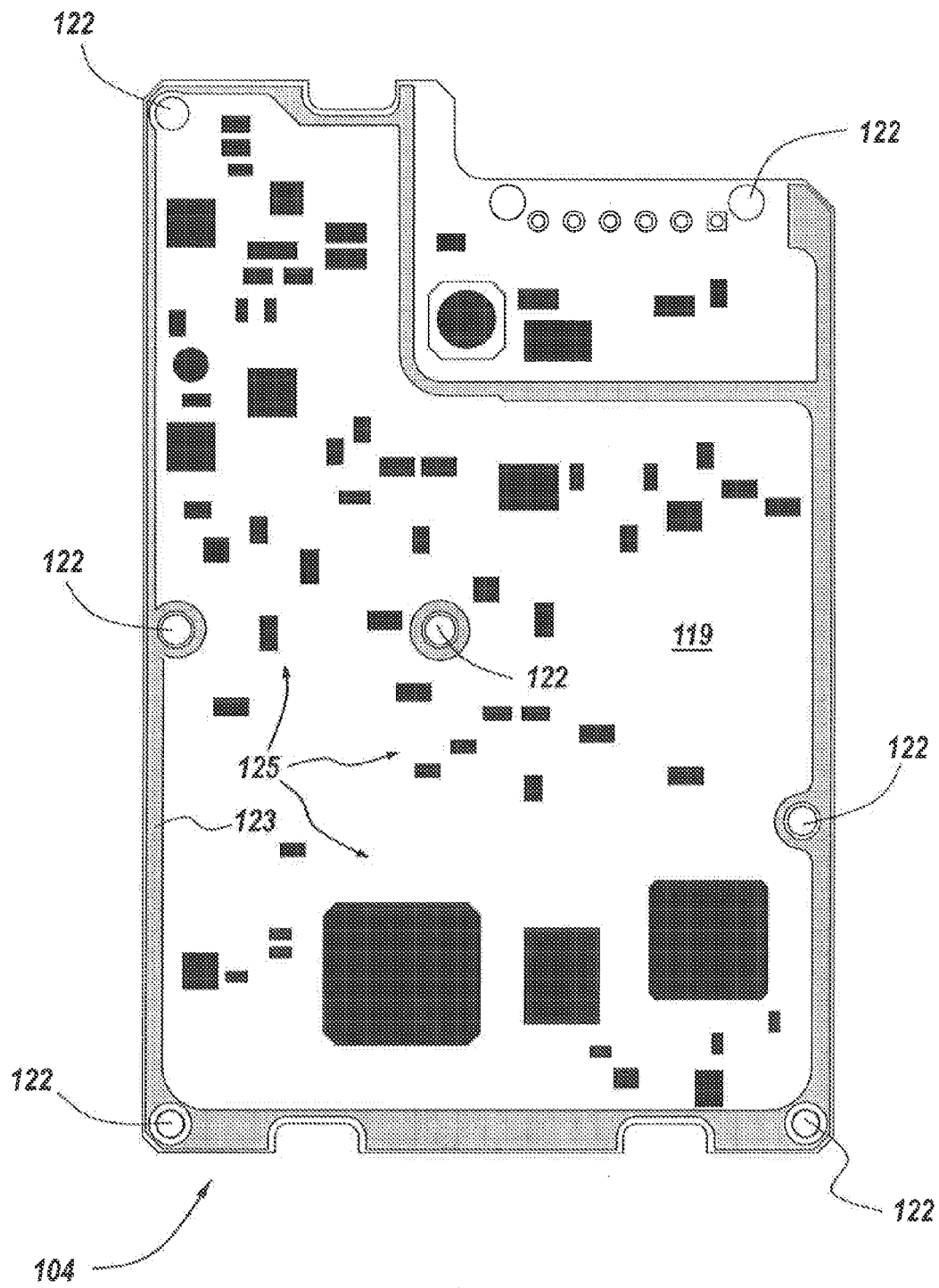
FIG. 5 includes a schematic bottom view of a printed circuit board (PCB) of the automobile radar module of FIGS. 1 and 2, according to some exemplary embodiments.

FIGS. 4 and 5 include a schematic top view and a schematic bottom view, respectively, of PCB 104, according to some exemplary embodiments. Referring to FIGS. 1 through 5, PCB 104 has a first side or top side 118, on which are mounted components, circuits and devices, referred to generally by reference numeral 121, which are related to the RF operation of radar module 100. For example, RF circuitry 121 can include one or more antenna regions 140a and 140b, which include antenna patch patterns 120a and 120b, respectively. In some exemplary embodiments, antenna region 140a is defined at least partially by a conductive trace 142a formed on top surface 118 of PCB 104 and at least partially surrounding antenna region 140a. Similarly, antenna region 140b is defined at least partially by a conductive trace 142b formed on top surface 118 of PCB 104 and at least partially surrounding antenna region 140b.

PCB 104 also has a second side or bottom side 119, on which are mounted components, circuits and devices, referred to generally by reference numeral 125, which are related to the digital electronic operation of module 100. For example, devices such as one or more digital signal processors (DSPs), semiconductor memories, input/output interface devices, and/or other digital electronic devices and discrete components, can be mounted on the second or bottom side 119 of PCB 104. According to some exemplary embodiments, bottom side 119 of PCB 104 also includes a conductive trace 123 formed on bottom side 119 and at least partially surrounding digital electronic circuitry 125 around the perimeter of PCB 104. When PCB 104 is assembled to housing 102 via heat stake posts 110, conductive trace 123 is brought into tight, permanent contact with conductive top surface 114 of PCB mounting shelf 112 integrally formed in housing 102. As a result, digital electronic circuitry 125 is enclosed within the region at the bottom of housing 102 under PCB 104, which provides EMI shielding for digital electronic circuitry 125.

Figure 6B:
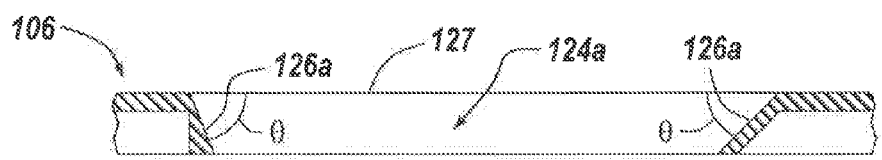
FIG. 6B includes a schematic cross-sectional view of the EMI shield of FIG. 6A, taken along line d-d of FIG. 6A.
Figure 6A:
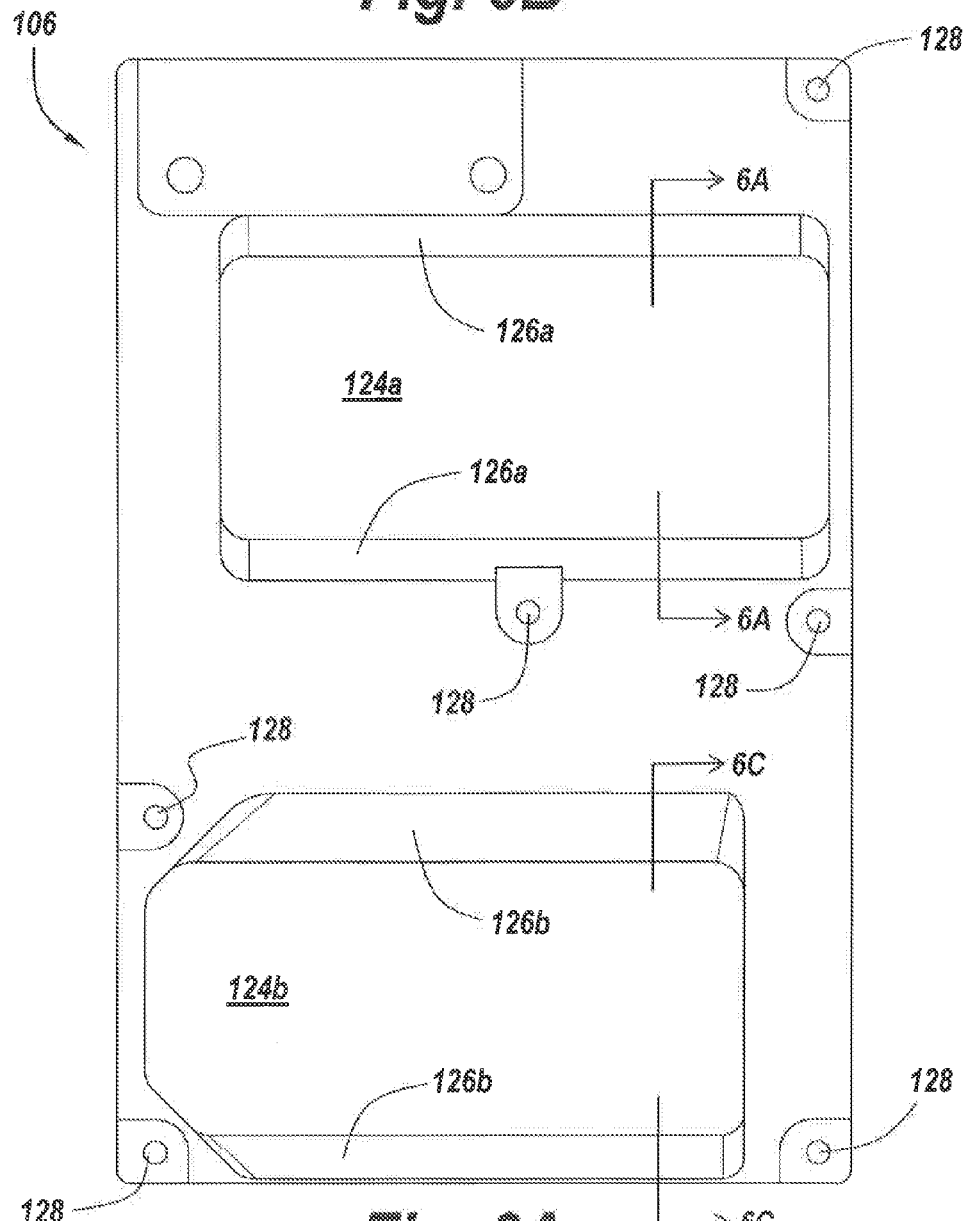
FIG. 6A includes a schematic top view of an EMI shield of the automobile radar module of FIGS. 1 and 2, according to some exemplary embodiments.
Figure 6C:
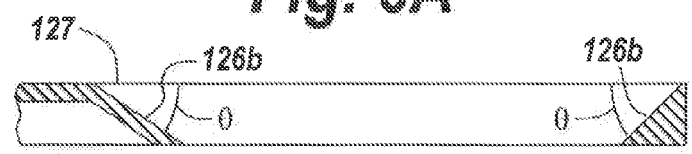
FIG. 6C includes a schematic cross-sectional view of the EMI shield of FIG. 6A, taken along line e-e of FIG. 6A.

Antenna regions 140a and 140b, which include antenna patch patterns 120a and 120b, respectively, formed on top surface 118 of PCB 104, are also EMI shielded according to exemplary embodiments. When EMI shield 106 is assembled over top surface 118 of PCB 104, apertures 124a and 124b are disposed to surround and, therefore, expose, antenna regions 140a and 140b, respectively. FIGS. 6A through 6C illustrated EMI shield 106 in detail. Specifically, FIG. 6A includes a schematic top view of EMI shield 106, according to some exemplary embodiments; FIG. 6B includes a schematic cross-sectional view of EMI shield 106, taken along line 6B-6B of FIG. 6A; and FIG. 6C includes a schematic cross-sectional view of EMI shield 106, taken along line 6C-6C of FIG. 6A. According to some embodiments, EMI shield 106 is formed of plastic and can be formed by injection molding. In some embodiments, the plastic is conductive plastic to provide EMI shielding characteristics. To further enhance EMI shielding, EMI shield 106 can also be formed with RF absorptive filler materials. Referring to FIGS. 1 through 5 and 6A through 6C, when module 100 is assembled via heat stake posts 110, the bottom surface of EMI shield 106 is held tightly and permanently against top surface 118 of PCB 104. The portions of the bottom surface of EMI shield 106 located around the perimeters of apertures 124a and 124b are held tightly against conductive traces 142a and 142b, respectively, such that apertures 124a and 124b define cavities electrically sealed to PCB 104 above antenna regions 140a and 140b, respectively.

Figure 7:
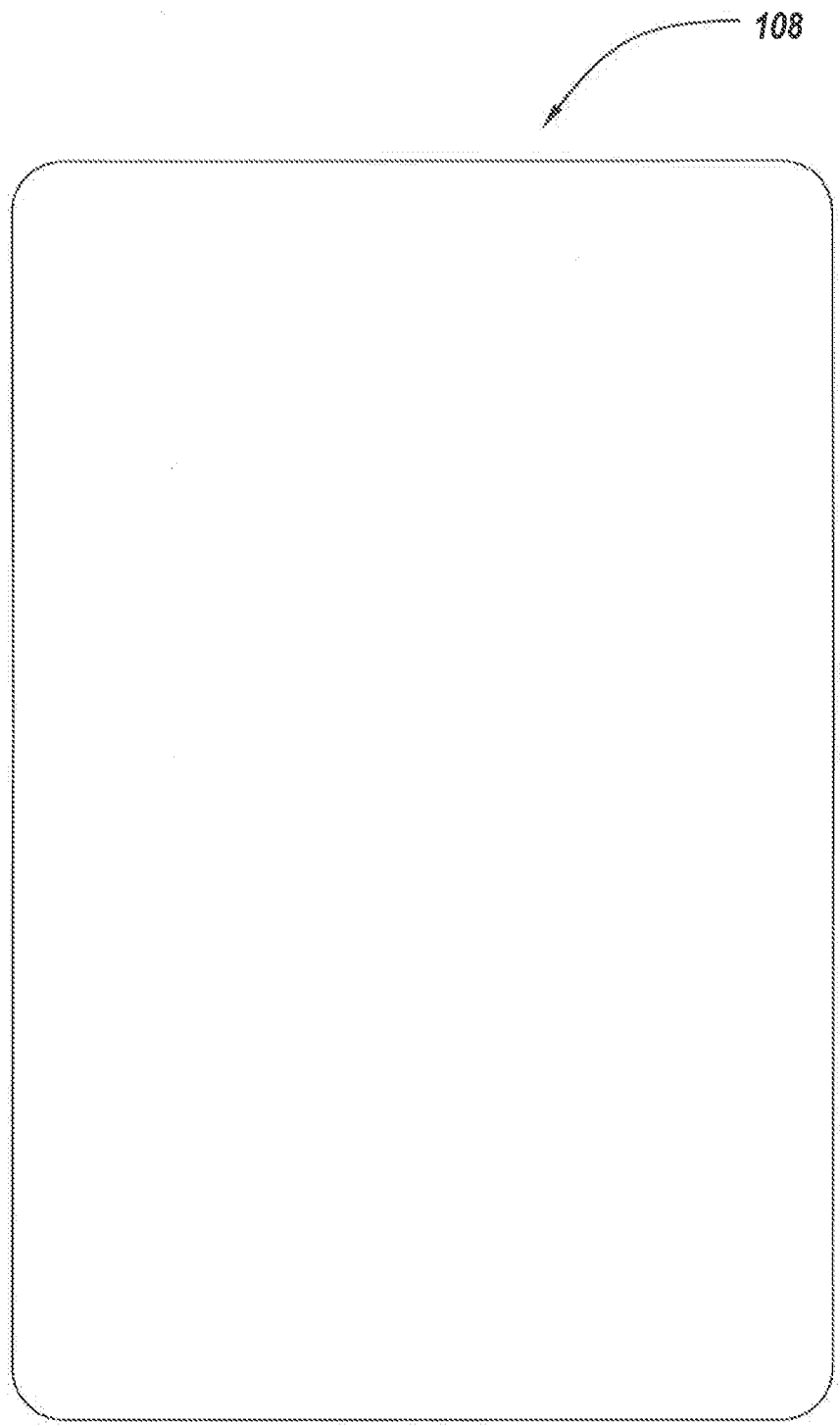
FIG. 7 includes a schematic top view of a radome of the automobile radar module of FIGS. 1 and 2, according to some exemplary embodiments.
Figure 8:
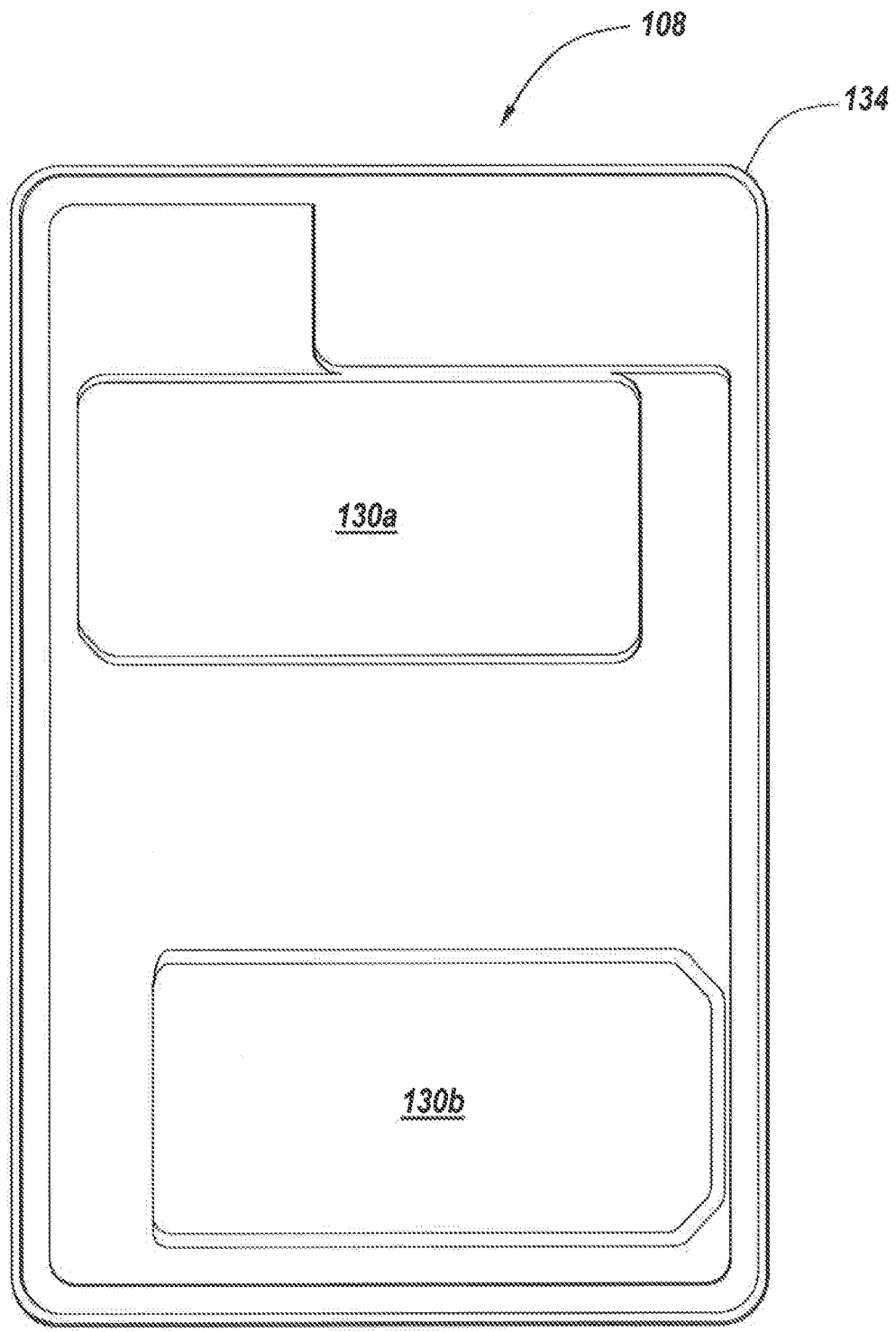
FIG. 8 includes a schematic bottom view of a radome of the automobile radar module of FIGS. 1 and 2, according to some exemplary embodiments.

FIGS. 7 and 8 include a schematic top view and a schematic bottom view, respectively, of radome or cover 108, according to some exemplary embodiments. Referring to FIGS. 1 through 8, radome 108 is installed over EMI shield 106 by fixedly attaching radome 108 to housing 102. Specifically, in some exemplary embodiments, radome 108 includes a groove 134 formed around the perimeter of its bottom side. The groove mates with a raised boss 132 around the perimeter of housing 102. Radome 108 can be sealed to housing 102 to complete assembly of module 100 by a process such as laser welding, which provides a hermetic seal.

Radome 108 includes protrusions 130a and 130b formed on its bottom surface. When radome 108 is installed in module 100, protrusions 130a and 130b protrude into the cavities formed by sidewalls 126a and 126b, respectively, of apertures 124a and 124b, respectively, of EMI shield 106 sealed to top surface 118 of PCB 104. According to the exemplary embodiments, these sealed cavities isolate antenna regions 140a and 140b from the rest of the circuitry in module 100, including other RF circuitry 121 on top surface 118 of PCB, as well as digital circuitry on bottom surface 119 of PCB 104. Interference among the various circuits, components and elements of module 100 is substantially reduced or eliminated. Also, EMI from external sources is substantially reduced or eliminated, as are EMI emissions from module 100.

According to some exemplary embodiments, the EMI shielding performance is enhanced by sidewalls 126a, 126b of apertures 124a, 124b, respectively, in EMI shield 106. Referring to FIGS. 6A through 6C, sidewalls 126a and 126b are formed at a non-perpendicular slope with respect to the top surface of EMI shield 106. That is, sidewalls 126a, 126b are formed at some predetermined acute angle θ with respect to the plane 127 of the top surface of EMI shield 106. It is noted that the reference numeral 126a is used to identify generally any of the sidewalls of aperture 124a, and the reference numeral 126b is used to identify generally any of the sidewalls of aperture 124b. Each of the sidewalls can be formed at a different angle θ with respect to plane 127, or they can be formed at the same angle θ. The illustrations herein of the sidewalls of apertures 124a and 124b show the sidewalls at different angles θ to illustrate the generality of the selection of the angles θ.

According to exemplary embodiments, the angles θ determine the shapes of the shielding cavities above antenna regions 140a and 140b on PCB 104. The angles θ are selected such that the cavities provide shielding characteristics according to operational parameters and characteristics of module 100 in a present desired application. Such operational parameters and characteristics can include, for example, frequency and/or power level target radiation for EMI shielding. In some exemplary embodiments, the angles θ can be selected to maximize the size of apertures 124a, 124b.

Figure 9A:
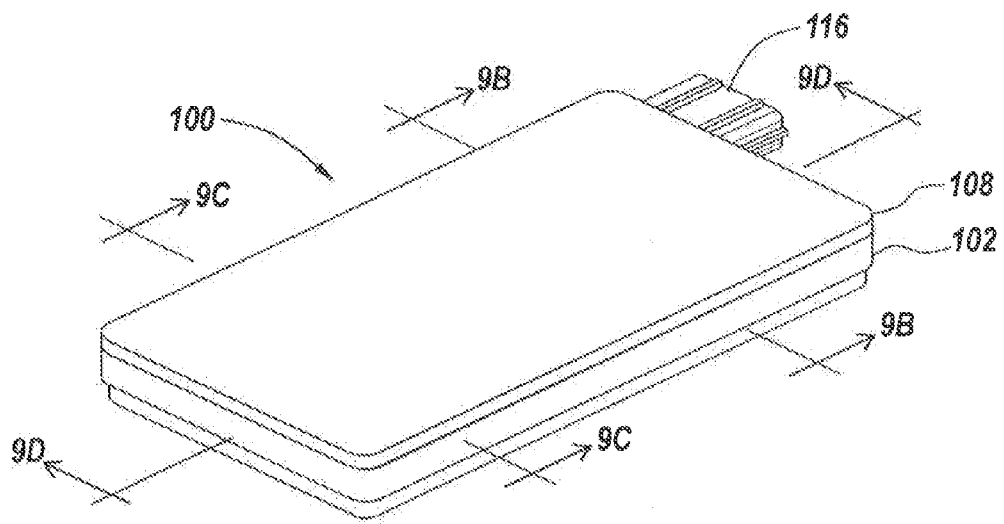
FIG. 9A includes a schematic perspective view of the automobile radar module of FIGS. 1 and 2, with the module assembled, according to some exemplary embodiments.
Figure 9B:
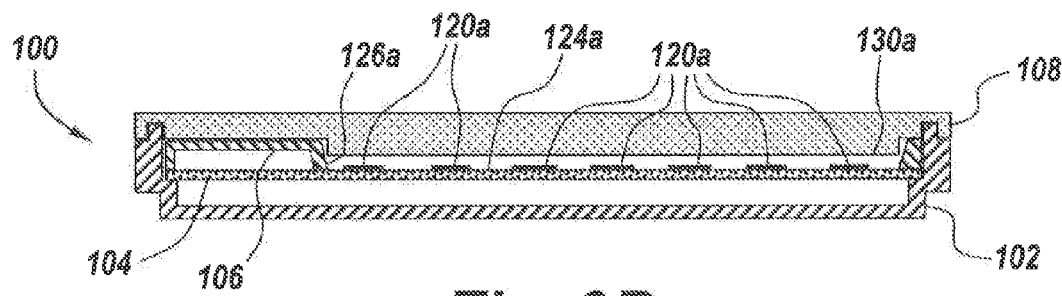
FIG. 9B includes a schematic cross-sectional view of the automobile radar module of FIG. 9A, taken along line 9B-9B of FIG. 9A.
Figure 9C:
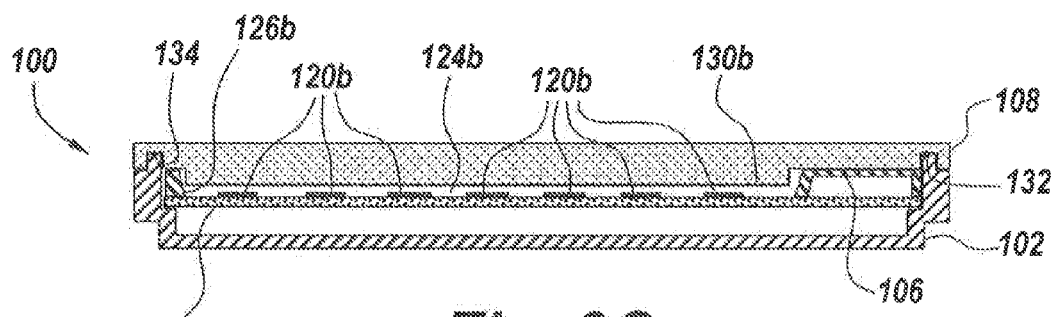
FIG. 9C includes a schematic cross-sectional view of the automobile radar module of FIG. 9A, taken along line 9C-9C of FIG. 9A.
Figure 9D:
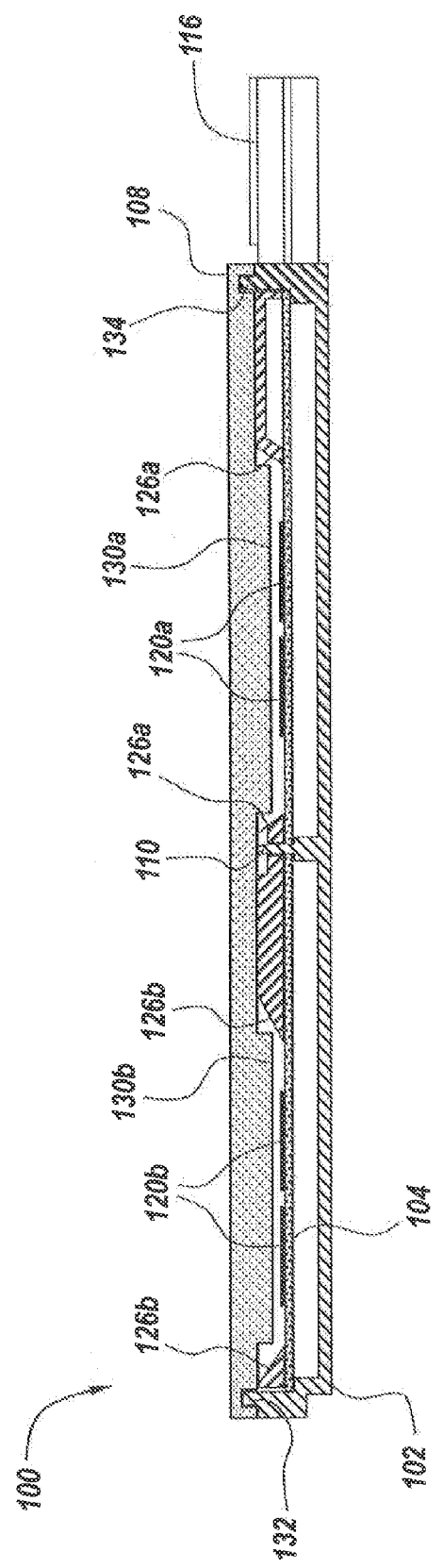
FIG. 9D includes a schematic cross-sectional view of the automobile radar module of FIG. 9A, taken along line 9D-9D of FIG. 9A.

FIG. 9A includes a schematic perspective view of automobile radar module 100 of FIGS. 1 through 8, with module 100 assembled, according to some exemplary embodiments. FIG. 9B includes a schematic cross-sectional view of automobile radar module 100 of FIG. 9A, taken along line 9B-9B of FIG. 9A. FIG. 9C includes a schematic cross-sectional view of automobile radar module 100 of FIG. 9A, taken along line 9C-9C of FIG. 9A. FIG. 9D includes a schematic cross-sectional view of automobile radar module 100 of FIG. 9A, taken along line 9D-9D of FIG. 9A.

Referring to FIG. 9A, module 100 is illustrated including radome or cover 108 sealed to housing 102. Connector shroud 116, integrally formed with housing 102, is also shown. Referring to FIGS. 9B through 9D, PCB 104 is shown mounted in housing 102. EMI shield 106 is shown mounted over PCB 104. Radome 108 is attached to housing 102 via the mating of groove 134 of radome 108 with raised boss 132 on housing 102. Aperture 124a in EMI shield 106 exposes antenna patch pattern 120a on PCB 104. Sloped, angled sidewalls 126a of aperture 124a together with protrusion 130a of radome 108 form the sealed cavity for EMI shielding of antenna patch pattern 120a. Similarly, aperture 124b in EMI shield 106 exposes antenna patch pattern 120b on PCB 104. Sloped, angled sidewalls 126b of aperture 124b together with protrusion 130b of radome 108 form the sealed cavity for EMI shielding of antenna patch pattern 120b.

Hence, according to the exemplary embodiments, a single PCB 104 integrates both RF and DSP functions, thus eliminating board-to-board connectors. PCB 104 is mounted directly onto the conductive surface of housing 102 to form a shielded compartment for EMI mitigation. Also, the present disclosure combines the functions of several discrete components, such as RF absorbers, conductive gaskets and RF covers, into a single injection molded EMI shield 106. The integrated design reduces module size, lowers cost and improves product quality.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. An automobile radar module, comprising:
   a housing;
   a printed circuit board (PCB) mounted in the housing, the PCB having a first side on which radio frequency (RF) electronic components are mounted and a second side on which digital electronic components are mounted;
   an electromagnetic interference (EMI) shield mounted over the first side of the PCB; and
   a radome mounted over the EMI shield; wherein:
   the EMI shield comprises at least one aperture through a primary surface of the EMI shield, the at least one aperture exposing at least a portion of the RF components on the first side of the PCB, such that radiation to and from the portion of the RF components of the first side of the PCB exposed by the aperture of the EMI shield passes through the aperture;
   the radome comprises at least one protrusion which protrudes into the at least one aperture in the EMI shield, such that the at least one protrusion on the radome and sidewalls of the at least one aperture on the EMI shield are shaped and positioned such that they are aligned to define a shielded region above the portion of the RF components on the first side of the PCB; and
   the sidewalls of the at least one aperture extend at an acute angle with respect to a plane of the primary surface of the EMI shield, the acute angle being selected based on operational parameters of the radar module such that a desired shielding performance is realized.

2. The automobile radar module of claim 1, wherein the PCB and the EMI shield are mounted in the housing on a plurality of heat-stake posts formed in the housing.

3. The automobile radar module of claim 1, wherein the housing is made of plastic.

4. The automobile radar module of claim 3, wherein the plastic is electrically conductive.

5. The automobile radar module of claim 3, wherein an electrically conductive plating is applied to the housing.

6. The automobile radar module of claim 3, wherein an electrically conductive paint is applied to the housing.

7. The automobile radar module of claim 1, wherein the EMI shield is made of plastic.

8. The automobile radar module of claim 7, wherein the plastic is electrically conductive.

9. The automobile radar module of claim 7, wherein an electrically conductive plating is applied to the EMI shield.

10. The automobile radar module of claim 7, wherein an electrically conductive paint is applied to the EMI shield.

11. A method of EMI shielding an automobile radar module, comprising:
   mounting a printed circuit board (PCB) in a housing, the PCB having a first side on which radio frequency (RF) electronic components are mounted and a second side on which digital electronic components are mounted;
   mounting an EMI shield over the first side of the PCB;
   mounting a radome over the EMI shield;
   forming at least one aperture through a primary surface of the EMI shield, the at least one aperture exposing at least a portion of the RF components on the first side of the PCB, such that radiation to and from the portion of the RF components of the first side of the PCB exposed by the aperture of the EMI shield passes through the aperture;
   forming at least one protrusion on the radome, the at least one protrusion protruding into the at least one aperture in the EMI shield, such that the at least one protrusion and sidewalls of the at least one aperture on the EMI shield are shaped and positioned such that they are aligned to define a shielded region above the portion of the RF components on the first side of the PCB; and
   forming the sidewalls of the at least one aperture at an acute angle with respect to a plane of the primary surface of the EMI shield, the acute angle being selected based on operational parameters of the radar module such that a desired shielding performance is realized.

12. The method of claim 11, wherein the PCB and the EMI shield are mounted in the housing on a plurality of heat-stake posts formed in the housing.

13. The method of claim 11, wherein the housing is formed of plastic.

14. The method of claim 13, wherein the plastic is electrically conductive.

15. The method of claim 13, further comprising applying an electrically conductive plating to the housing.

16. The method of claim 13, further comprising applying an electrically conductive paint to the housing.

17. The method of claim 11, wherein the EMI shield is formed of plastic.

18. The method of claim 17, wherein the plastic is electrically conductive.

19. The method of claim 17, further comprising applying an electrically conductive plating to the EMI shield.

20. The method of claim 17, further comprising applying an electrically conductive paint to the EMI shield.

* * * * *